US011966365B2

(12) United States Patent
Ban

(10) Patent No.: US 11,966,365 B2
(45) Date of Patent: Apr. 23, 2024

(54) NON-TRANSITORY COMPUTER-READABLE RECORDING MEDIUM STORING COMPUTER-READABLE INSTRUCTIONS FOR TERMINAL DEVICE, AND METHOD EXECUTED BY TERMINAL DEVICE

(71) Applicant: BROTHER KOGYO KABUSHIKI KAISHA, Nagoya (JP)

(72) Inventor: Ryoji Ban, Ama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/935,107

(22) Filed: Sep. 25, 2022

(65) Prior Publication Data

US 2023/0094562 A1 Mar. 30, 2023

(30) Foreign Application Priority Data

Sep. 30, 2021 (JP) ................. 2021-161887

(51) Int. Cl.
*G06F 16/14* (2019.01)
*G06F 16/28* (2019.01)
*G06F 40/295* (2020.01)

(52) U.S. Cl.
CPC .......... *G06F 16/148* (2019.01); *G06F 16/284* (2019.01); *G06F 40/295* (2020.01)

(58) Field of Classification Search
CPC .... G06F 16/148; G06F 16/284; G06F 40/295; G06F 3/12
See application file for complete search history.

(56) References Cited

U.S. PATENT DOCUMENTS

| 7,287,001 | B1 * | 10/2007 | Falls | G06Q 20/202 |
| | | | | 705/28 |
| 8,393,540 | B2 * | 3/2013 | Alleshouse | G06K 1/121 |
| | | | | 235/462.15 |
| 9,727,700 | B2 * | 8/2017 | Roberts | G06K 15/02 |
| 11,170,276 | B2 | 11/2021 | Shinagawa | |

(Continued)

FOREIGN PATENT DOCUMENTS

| JP | 2006-268388 A | 10/2006 |
| JP | 2007128325 A | 5/2007 |

OTHER PUBLICATIONS

Office Action issued in U.S. Appl. No. 18/147,143 dated Aug. 4, 2023.

*Primary Examiner* — Kuen S Lu
(74) *Attorney, Agent, or Firm* — KENEALY VAIDYA LLP

(57) ABSTRACT

A terminal device may, in a case where a first association instruction is acquired, store a first association between a label file and a first database file, and, in a case where a second association instruction is acquired, store a second association between a first object area and a first field name. The terminal device may, in a case where a first print instruction is acquired, create N pieces of first print data and send the N pieces of first print data to a label printer. The terminal device may, in a case where a disassociation instruction is acquired under the state where the first association and the second association are stored, disassociate the first association between the label file and the first database file without disassociating the second association between the first object area and the first field name.

14 Claims, 11 Drawing Sheets

(56) References Cited

U.S. PATENT DOCUMENTS

| | | |
|---|---|---|
| 2005/0137937 A1 | 6/2005 | Njo et al. |
| 2007/0174151 A1* | 7/2007 | Anderson .............. G06Q 10/08 |
| | | 705/28 |
| 2015/0326751 A1 | 11/2015 | Ando |
| 2016/0052659 A1 | 2/2016 | Bowers et al. |
| 2016/0352932 A1 | 12/2016 | Asai |
| 2019/0182404 A1 | 6/2019 | Sato et al. |
| 2020/0104086 A1 | 4/2020 | Asai |
| 2022/0317942 A1 | 10/2022 | Nagao et al. |
| 2023/0094288 A1 | 3/2023 | Ban |
| 2023/0094562 A1 | 3/2023 | Ban |
| 2023/0205464 A1 | 6/2023 | Ban |

* cited by examiner (Case E)

(T410) "Menu"→"Connect"→csv File CF2

(Case G)(Second Embodiment)

(T610) "Menu"→"Connect"
→csv File CF2

NON-TRANSITORY COMPUTER-READABLE RECORDING MEDIUM STORING COMPUTER-READABLE INSTRUCTIONS FOR TERMINAL DEVICE, AND METHOD EXECUTED BY TERMINAL DEVICE

REFERENCE TO RELATED APPLICATION

This application claims priority from Japanese Patent Application No. 2021-161887 filed on Sep. 30, 2021. The entire content of the priority application is incorporated herein by reference.

BACKGROUND ART

A system including a printer device and a personal computer is known. The personal computer stores an object within a work area and a field name in a database in association with each other under a state where the personal computer is connected to the database. When the personal computer obtains an instruction for print execution in this state, the personal computer executes printing of a label having a text corresponding to the field name in the database arranged in the object.

DESCRIPTION

When the personal computer disconnects the connection with the database in the above system, the association between the object and the field name is assumed to be disassociated. The present teachings provide an art configured to improve user convenience.

The disclosure herein discloses a non-transitory computer-readable recording medium storing computer-readable instructions for a terminal device. The terminal device may comprise: a processor, and memory: wherein the computer-readable instructions, when executed by the processor, cause the terminal device to: in a case where a first association instruction for associating a label file and a first database file is acquired, store a first association between the label file and the first database file in the memory, wherein one or more object areas where a print target text is to be disposed are defined in the label file, the first database file includes one or more field names and M pieces (M being an integer of 1 or more) of text information, and each of the M pieces of text information includes a first text associated with a first field name among the one or more field names; in a case where a second association instruction for associating a first object area among the one or more object areas and the first field name is acquired, store a second association between the first object area and the first field name in the memory; in a case where a first print instruction for instructing printing using the label file is acquired under a state where the first association and the second association are stored in the memory, create N pieces (N being an integer of 1 or more and equal to or less than the M) of first print data using the label file and the first database file associated with the label file, the N pieces of first print data corresponding to N pieces of text information among the M pieces of text information included in the first database file, wherein in each of the N pieces of first print data, the first text included in the text information corresponding to the first print data is disposed in the first object area associated with the first field name; send the N pieces of first print data to a label printer; and in a case where a disassociation instruction for disassociating the first association between the label file and the first database file is acquired under the state where the first association and the second association are stored in the memory, disassociate the first association between the label file and the first database file without disassociating the second association between the first object area and the first field name.

According to the above configuration, if the disassociation instruction is acquired under a state where the first association and the second association are stored in the memory, the terminal device disassociates the first association between the label file and the first database file without disassociating the second association between the first object area and the first field name. Due to this, even when the first association between the label file and the first database file is disassociated, the second association between the first object area and the first field name is maintained. Thus, user convenience may be improved.

The above computer-readable instructions (computer program), a terminal device realized by the computer program, and a method implemented by the terminal device are also novel and useful.

Figure 1:
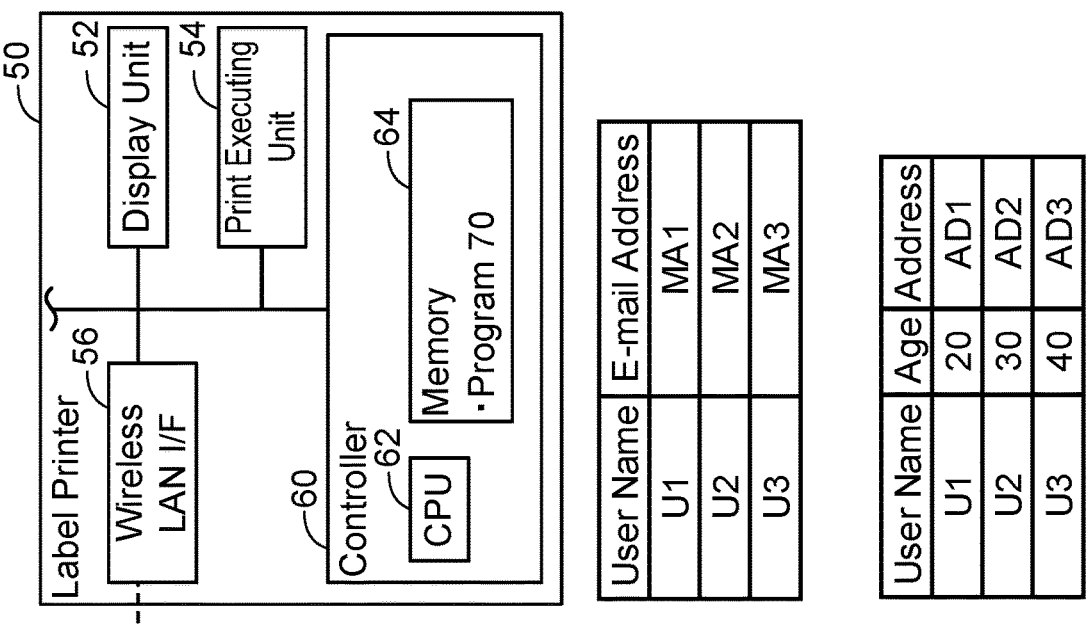
FIG. 1 illustrates a configuration of a communication system.
Figure 1:
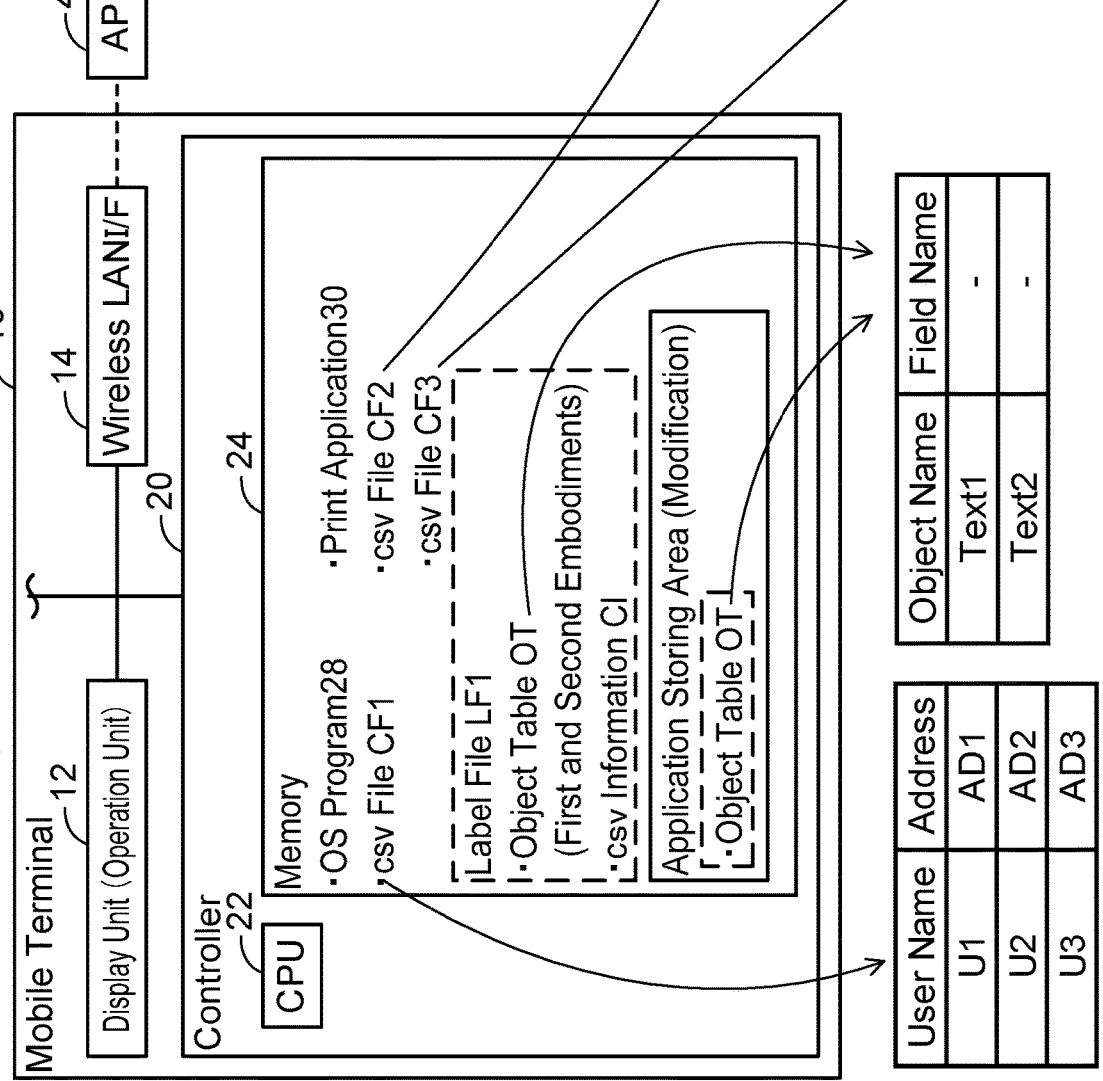

FIRST EMBODIMENT (Configuration of Communication System 2; FIG. 1)

As shown in FIG. 1, a communication system 2 comprises a mobile terminal 10 and a label printer 50. The mobile terminal 10 and the label printer 50 have wireless connection established with an Access Point (AP) 4. The mobile terminal 10 and the label printer 50 are configured to communicate with each other via the AP 4.

In the present embodiment, it is realized that a user creates a label attachable to a target to be managed by using the mobile terminal 10 and the label printer 50. The label is created by the label printer 50 printing a label image on an adhesive sticker. The mobile terminal 10 creates a label file which is a data file representative of a label image, and sends print data acquired from the label file to the label printer 50.

(Configuration of Mobile Terminal 10)

The mobile terminal 10 is a mobile terminal device such as a mobile phone, a smartphone, a PDA, a laptop PC, a tablet PC, a mobile music playing device, and a mobile video player. The mobile terminal 10 comprises a display unit 12, a wireless LAN interface (hereafter, interface will be referred to as "I/F") 14, and a controller 20.

The display unit 12 is a display for displaying various information. The display unit 12 functions also as a so-called touch pad. Thus, the user can input various kinds of instructions to the mobile terminal 10 by operating a plurality of keys displayed on the display unit 12. That is, the display unit 12 functions as an operation unit also.

The wireless LAN I/F 14 is a I/F configured to execute Wi-Fi communication in accordance with Wi-Fi scheme, and has wireless connection established with the AP 4. The Wi-Fi scheme is a wireless communication scheme of 802.11 standards by the Institute of Electrical and Electronics Engineers, Inc. (IEEE) and its subordinate standards (e.g., 802.11a, 11b, 11g, 11n, 11ac).

The controller 20 comprises a CPU 22 and a memory 24. The memory 24 may be constituted of a volatile memory, and/or a non-volatile memory, for example. The CPU 22 is configured to execute various processes in accordance with an operating system (OS) program 28, a print application 30 that are stored in the memory 24. The OS program 28 is a program for controlling various kinds of basic operations of the mobile terminal 10. The print application 30 is an application provided by a vendor of the label printer 50, and is installed on the mobile terminal 10 from a server on the Internet. The print application 30 is an application for causing the label printer 50 to print or the like by using the mobile terminal 10. Hereafter, the application will be referred to as "app".

The memory 24 further stores csv files CF1, CF2, and CF3. The csv files are each a text file in which plural texts are set off by commas. FIG. 1 illustrates plural texts written in the csv files CF1, CF2, and CF3 respectively in table format. In a first row of each of the csv files CF1, CF2, and CF3 (that is, uppermost row), field names are written. In the csv file CF1, texts corresponding to the field name "User Name" and texts corresponding to the field name "Address" are respectively aligned along a column direction (vertical direction). In the csv file CF2, texts corresponding to the field name "User Name" and texts corresponding to the field name "E-mail Address" are respectively aligned along the column direction. In the csv file CF3, texts corresponding to the field name "User Name", texts corresponding to the field name "Age" and texts corresponding to the field name "Address" are respectively aligned along the column direction. Hereafter, the plural texts that are aligned on a second row and subsequent row(s) in a row direction (lateral direction) in each csv file may collectively termed "text information". For example, in case of the csv file CF1, "U1, AD1", "U2, AD2", and "U3, AD3" are the text information.

The memory 24 may further store a label file LF1. In the label file LF1, an object table OT and csv information CI may be written. In the object table OT, object names and the field names have been associated (in association) with each other. The object names are each information for identifying an object area which will be described later. The csv information CI is information indicating a csv file associated with the label file LF1. In the present embodiment, the label file LF1 is configured so that the label file LF1 cannot be associated simultaneously with two or more csv files. That is, information indicating one single csv file is to be written in the csv information CI.

(Configuration of Label Printer 50)

The label printer 50 comprises a display unit 52, a print executing unit 54, a wireless LAN I/F 56, and a controller 60.

The display unit 52 is a display for displaying various kinds of information. The print executing unit 54 is of a so-called thermal transfer printing mechanism, and configured to create a label by copying a label image on a sticker. In a modification, the print executing unit 54 may be of another printing mechanism such as an ink-jet scheme, a laser scheme. The wireless LAN I/F 56 is similar to the wireless LAN I/F 14 mentioned above.

The controller 60 comprises a CPU 62 and a memory 64. The CPU 62 is configured to execute various processes in accordance with a program 70 stored in the memory 64. The memory 64 may be constituted of a volatile memory and/or a nonvolatile memory, for example.

(Specific Cases; FIGS. 2 to 9)

With reference to FIGS. 2 to 9, specific Cases A to F realized by the communication system 2 in the present embodiment will be described.

Figure 2:
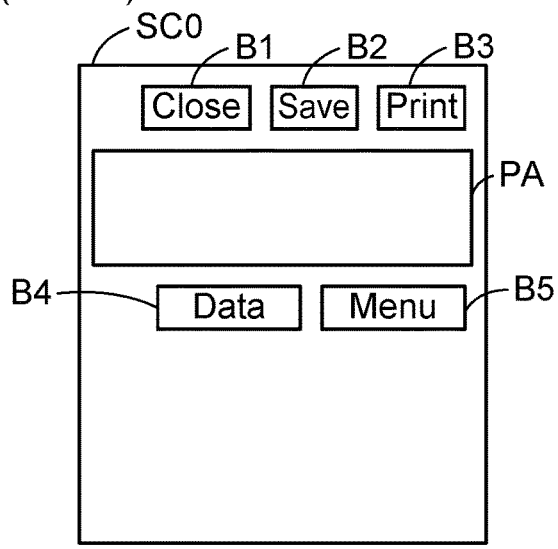
FIG. 2 illustrates a sequence of Case A in which a label is printed.
Figure 2:
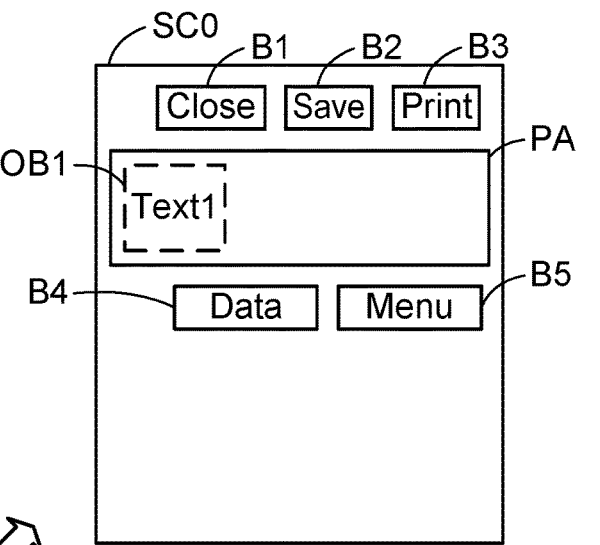
Figure 2:
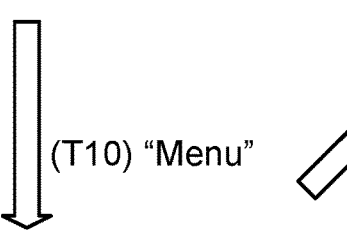
Figure 2:
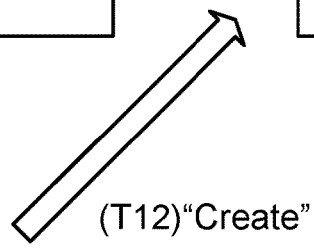
Figure 2:
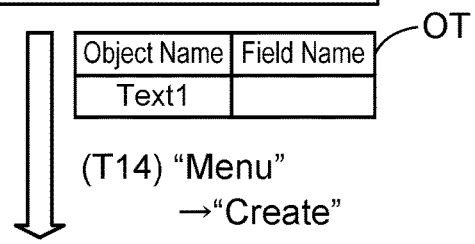
Figure 2:
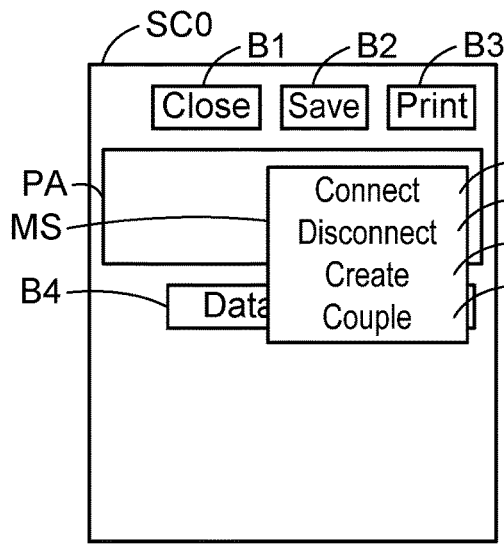
Figure 2:
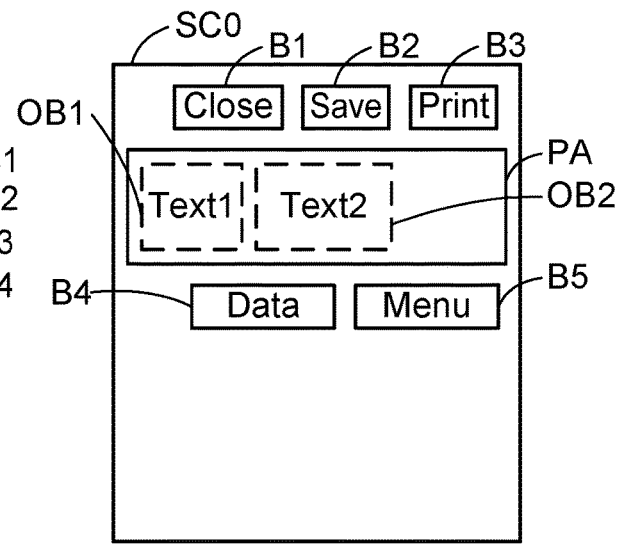
Figure 2:
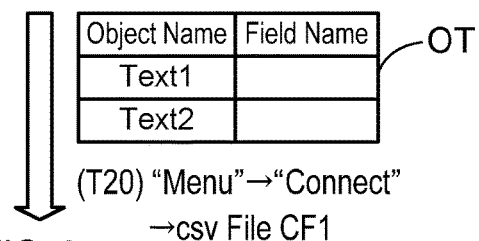
Figure 3:
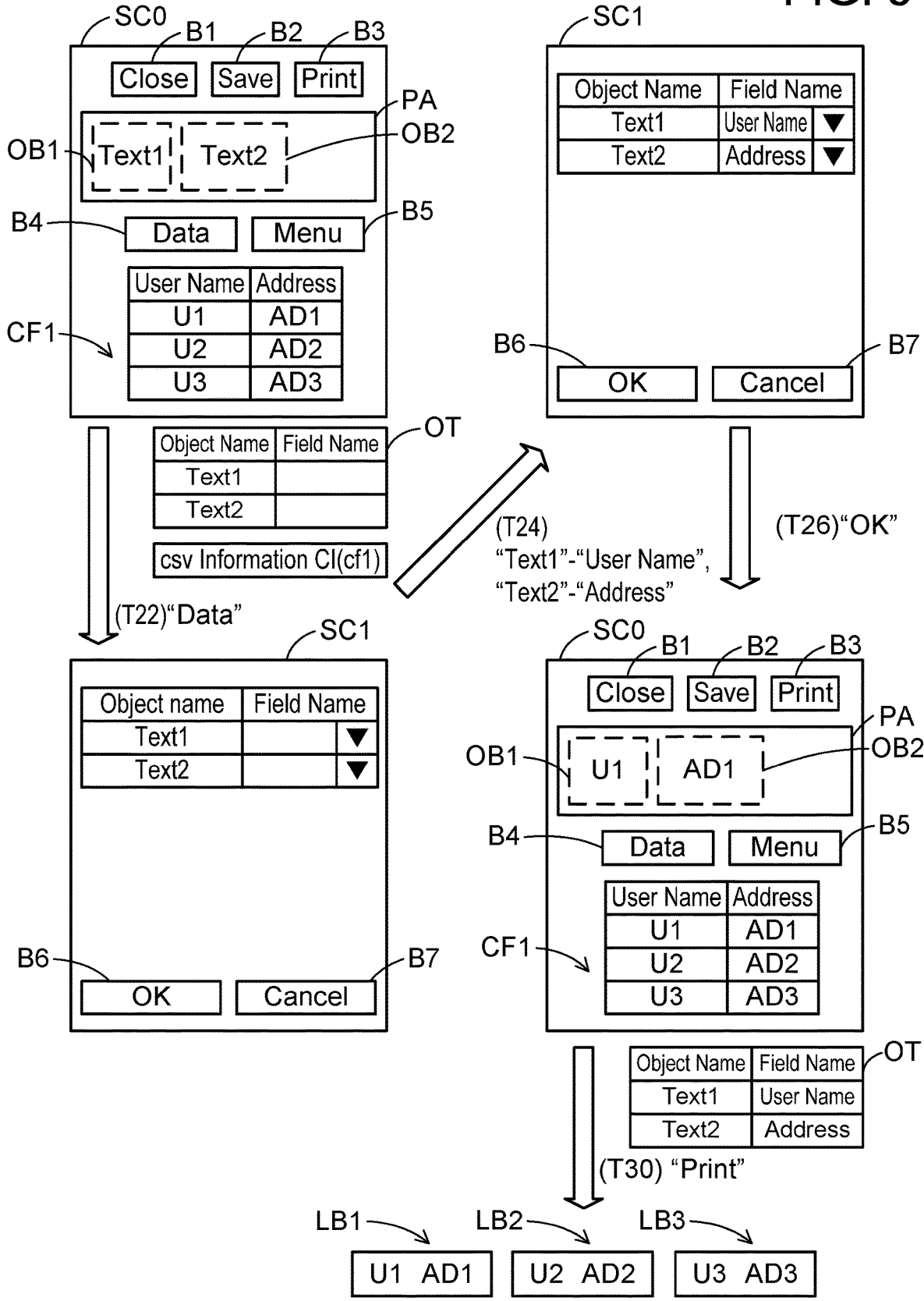
FIG. 3 illustrates a sequence which is continuation of FIG. 2.

(Case A; FIGS. 2 and 3)

With reference to FIGS. 2 and 3, Case A in which labels LB1 to LB3 (see FIG. 3) are printed will be described. In an initial state of Case A, the memory 24 has the label file LF1 stored therein. The object table OT and the csv information CI of the label file LF1 are in empty state.

The mobile terminal 10 is configured to execute the following processes in accordance with the print application 30 when the mobile terminal 10 has received an application activation operation for activating the print app 30. Firstly, upon receiving an operation for opening the label file LF1, the mobile terminal 10 displays a top screen SC0 on the display unit 12. The top screen SC0 includes a Close button B1, a Save button B2, a Print button B3, a Data button B4, a Menu button B5, and a print area PA. The Close button B1 is for finishing the print app 30. The Save button B2 is for saving the label file LF1. The Print button B3 is for executing a label printing process. The Data button B4 is for displaying an object screen SC1 (see FIG. 3) for associating an object area and a field name. The Menu button B5 is for displaying plural menus. The print area PA is an area which corresponds to a label image to be printed by the label printer 50.

The mobile terminal 10 displays a menu screen MS on the top screen SC0 when receiving selection of the Menu button B5 in T10. The menu screen MS includes a Connect button MB1, a Disconnect button MB2, a Create button MB3, and a Couple button MB4. The Connect button MB1 is for opening a new csv file and associating this new csv file and the label file being currently opened. The Disconnect button MB2 is for disassociating an association between a label file and a csv file. The Create button MB3 is for creating an object area. The object area is an area in which text(s) of print target are to be disposed. The Couple button MB4 is for displaying a coupling screen SC2 for coupling field names (see FIG. 6).

The mobile terminal 10 receives selection of the Create button MB3 in T12. Then the mobile terminal 10 displays an object area OB1 in the print area PA of the top screen SC0 when an area in which the new object area OB1 is to be disposed has been designated and an input of an object name "Text 1" of the new object area OB1 has been received. Although the object name "Text 1" is displayed in the object area OB1 in the present embodiment, a text different from the object name may be displayed in the object area OB1. The mobile terminal 10 stores the object name "Text 1" in the object table OT. At this timing, the object name "Text 1" has no field name associated therewith in the object table OT.

The mobile terminal 10 receives selection of the Menu button B5 and receives selection of the Create button MB3 in T14. Then, the mobile terminal 10 displays an object area OB2 in the print area PA of the top screen SC0 when an area in which the new object area OB2 is to be disposed has been designated and an input of the object name "Text 2" of the new object area OB2 has been received. The mobile terminal 10 stores the object name "Text 2" in the object table OT. At this timing, the object names "Text 1" and "Text 2" have no field name associated therewith respectively in the object table OT.

When the selection of the Menu button B5 is received, the selection of the Connect button MB1 is received, and selection of the csv file CF1 is received in T20, the mobile terminal 10 displays the csv file CF1 in table format on the top screen SC0 of FIG. 3. Further, the mobile terminal 10 determines that a first file connection instruction for associating the label file LF1 and the csv file CF1 has been acquired, and stores the file name "cf1" of the csv file CF1 in the csv information CI within the label file LF1. Due to this, a first label association between the label file LF1 and the csv file CF1 is stored in the memory 24.

When the selection of the Data button B4 is received in T22, the mobile terminal 10 displays an object screen SC1 on the display unit 12. In the object screen SC1, a field name setting box is associated with each of the object names "Text 1", "Text 2" stored in the object table OT. In the present case, a user can select the field names "User Name", "Address" in the csv file CF1 by operating the filed name setting boxes. The object screen SC1 further includes an OK button B6 and a Cancel button B7. When an operation of selecting the field name "User Name" as the field name to be associated with the object name "Text 1" and of selecting the field name "Address" as the field name to be associated with the object name "Text 2" is received in T24, the mobile terminal 10 displays "User Name" in the field name corresponding to the object name "Text 1", and displays "Address" in the field name corresponding to the object name "Text 2". When the selection of the OK button B6 is received in T26, the mobile terminal 10 determines that a first object connection instruction for associating the object name "Text 1" and the field name "User Name" and a second object connection instruction for associating the object name "Text 2" and the field name "Address" have been acquired, and stores "User Name" in the field name associated with the object name "Text 1" and stores "Address" in the field name associated with the object name "Text 2" in the object table OT. Due to this, a first object association between the object area OB1 and the field name "User Name" is stored in the memory 24, and a second object association between the object area OB2 and the field name "Address" is stored in the memory 24. Further, the mobile terminal 10 displays a text "U1" corresponding to the field name "User Name" in the object area OB1, and displays a text "AD1" corresponding to the field name "Address" in the object area OB2. As mentioned above, the mobile terminal 10 stores an object names and a field name in association with each other in the object table OT. According to the above feature, the mobile terminal 10 can easily manage respective associations between an object name and a field name. Further, since the object table OT is stored in the label file LF1, the mobile terminal 10 can access the object table OT faster as compared to a case where the object table OT is stored in a file different from the label file LF1.

When the selection of the Print button B3 is received in T30, the mobile terminal 10 determines that the print instruction was acquired and performs label printing. The mobile terminal 10 uses the label file LF1 and the csv file CF1 associated with the label file LF1 to create three pieces of print data corresponding to three pieces of text information included in the csv file CF1. In each of the three pieces of print data, the text (U1, U2, U3) corresponding to the field name "User Name" included in the text information corresponding to this piece of print data is disposed in the object area OB1 associated with the field name "User Name" and the text (AD1, AD2, AD3) corresponding to the field name "Address" included in the same text information is disposed in the object area OB2 corresponding to the field name "User Name". Next, the mobile terminal 10 sends the three pieces of print data to the label printer 50. When the label printer 50 has received the three pieces of print data from the mobile terminal 10, the label printer 50 prints labels LB1 to LB3 by using the three pieces of print data. In the label LB1, the texts "U1" and "AD1" are shown, in the label LB2, the texts "U2" and "AD2" are shown, and in the label LB3, the texts "U3" and "AD3" are shown. Here, a user may select a part of the csv file CF1 as a range to be printed. For example, the user may select only a second row and a third row in the csv file CF1 as the range to be printed. In this case, a label LB1 including the texts "U1" and "AD1" written on the second row of the csv file CF1 and a label LB2 including the texts "U2" and "AD2" written on the third row of the csv file CF1 are printed.

Figure 4:
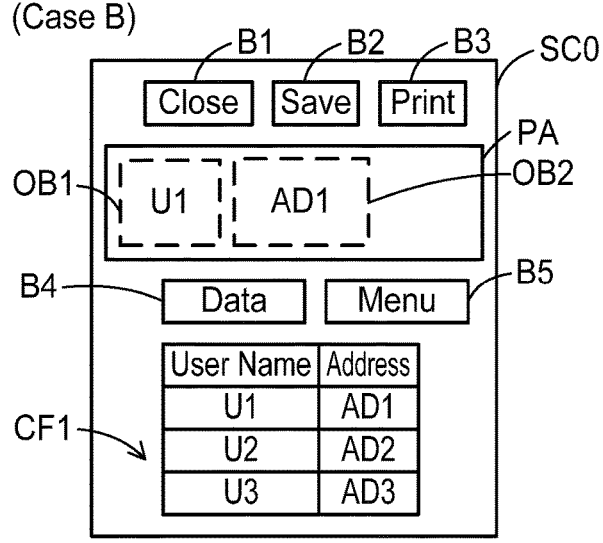
FIG. 4 illustrates a sequence of Case B in which a csv file to be associated with the label file is changed.
Figure 4:
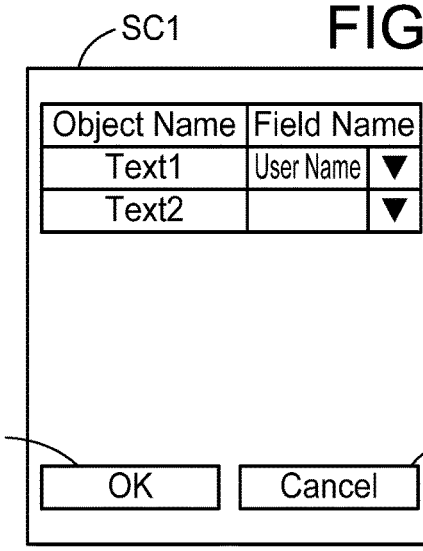
Figure 4:
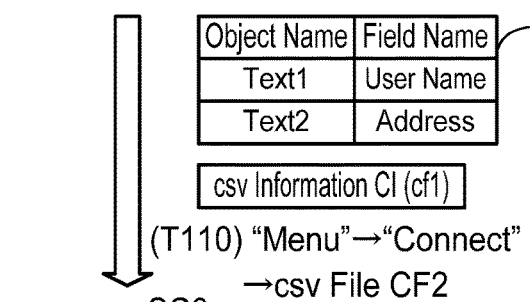
Figure 4:
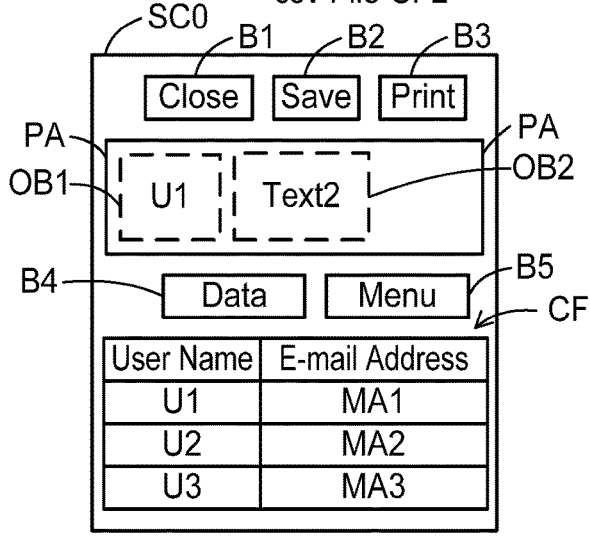
Figure 4:
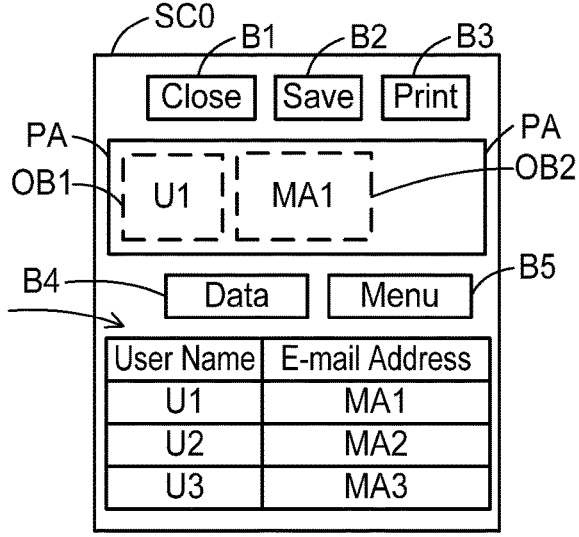
Figure 4:
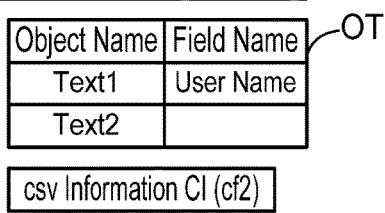
Figure 4:
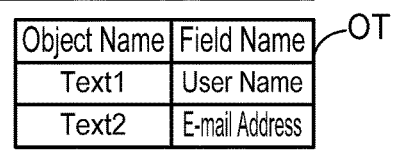

(Case B; FIG. 4)

Subsequently, with reference to FIG. 4, Case B where a csv file associated with the label file LF1 is changed from the csv file CF1 to the csv file CF2 will be described. An initial state of Case B is a state after Case A. That is, the memory 24 of the mobile terminal 10 has the first label association, the first object association, and the second object association stored therein.

When the selection of the Menu button B5, the selection of the Connect button MB1 within the menu screen MS (see FIG. 2), and the selection of the csv file CF2 are received in T110, the mobile terminal 10 displays the csv file CF2 in table format on the top screen SC0. Further, the mobile terminal 10 determines that a file conversion instruction for associating the label file LF1 and the csv file CF2 different from the csv file CF1 has been acquired, and deletes the file name "cf1" in the csv information CI within the label file LF1 and stores a file name "cf2" of the csv file CF2 instead. In a modification, the mobile terminal 10 may overwrite the file name "cf1" with the file name "cf2" in the csv information CI within the label file LF1. Due to this, the first label association between the label file LF1 and the csv file CF1 is disassociated and a second label association between the label file LF1 and the csv file CF2 is stored in the memory 24. The mobile terminal 10 also specifies the field names "User Name", "Address" in the object table OT. Subsequently, the mobile terminal 10 determines that the csv file CF2 includes the field name "User Name" but does not include the field name "Address", and disassociates the second object association between the object area OB2 and the field name "Address" without disassociating the first object association between the object area OB1 and the field name "User Name". Specifically, the mobile terminal 10 deletes the field name "Address" associated with the object name "Text 2" in the object table OT. The mobile terminal 10 also changes the text in the object area OB2 from "AD1" to "Text 2".

When the selection of the Data button B4 is received in T120, the mobile terminal 10 displays the object screen SC1 on the display unit 12. In the object screen SC1 of the present case, "User Name" is displayed in the filed name setting box corresponding to the object name "Text 1". The user is able to select the field names "User Name" and "E-mail Address" in the csv file CF2 by operating each field name setting box. When the selection of the field name "E-mail Address" as the field name to be associated with the object name "Text 2" is received and the selection of the OK button B6 is received in T122, the mobile terminal 10 determines that a third object connection instruction for associating the object name "Text 2" and the field name "E-mail Address" has been acquired, and stores "E-mail Address" in the field name associated with the object name "Text 2" in the object table OT. Due to this, the third object association between the object area OB2 and the field name "E-mail Address" is stored in the memory 24. Further, the mobile terminal 10 displays the text "MA1" corresponding to the field name "E-mail Address" in the object area OB2.

When the selection of the Print button B3 is received in T130, the mobile terminal 10 determines that a print instruction has been acquired, and performs label printing. The mobile terminal 10 uses the label file LF2 and the csv file CF2 associated with the label file LF2 to create three pieces of print data corresponding to three pieces of text information included in the csv file CF2. In each of the three pieces of print data, a text (U1, U2, U3) corresponding to the field name "User Name" included in the text information corresponding to this piece of print data is disposed in the object area OB1, and a text (MA1, MA2, MA3) corresponding to the field name "E-mail Address" included in the same text information is disposed in the object area OB2. Next, the mobile terminal 10 sends the three pieces of print data to the label printer 50. When the label printer 50 has received the three pieces of print data from the mobile terminal 10, the label printer 50 uses the three pieces of print data to print labels LB11 to LB13. In the label LB11, texts "U1" and "MA1" are shown, in the label LB12, texts "U2" and "MA2" are shown, and in the label LB13, texts "U3" and "MA3" are shown.

(Effects of Case B)

As shown in Case B, when the file conversion instruction is acquired under the state where the first label association and the first object association are stored in the memory 24, the mobile terminal 10 disassociates the first label association without disassociating the first object association (T110). Further, after the first label association has been disassociated, the mobile terminal 10 stores the second label association in the memory 24 (T110). According to such configuration, the user does not need to perform operation for associating the object area OB1 and the field name "User Name" again after the second label association has been stored in the memory 24. Accordingly, user convenience can be improved.

Further, when the file conversion instruction is acquired and also the csv file CF2 includes the field name "User Name" but does not include the field name "Address" under the state where the first label association, the first object association, and the second object association are stored in the memory 24, the mobile terminal 10 disassociates the first label association and disassociates the second object association without disassociating the first object association. In this case, the user does not need to perform the operation for associating the object area OB1 and the field name "User Name" again after the csv file associated with the label file LF1 has been changed. Further, if label printing is performed under a state where the object area OB2 and the field name "Address" which does not exist in the csv file CF2 have been associated, a label which is not the one the user intended will be printed. According to the above configuration, the second object association between the object area OB2 and the field name "Address" which does not exist in the csv file CF2 is disassociated. Due to this, printing of a label which is not what the user intends can be suppressed. Thus, user convenience can be improved.

Figure 5:
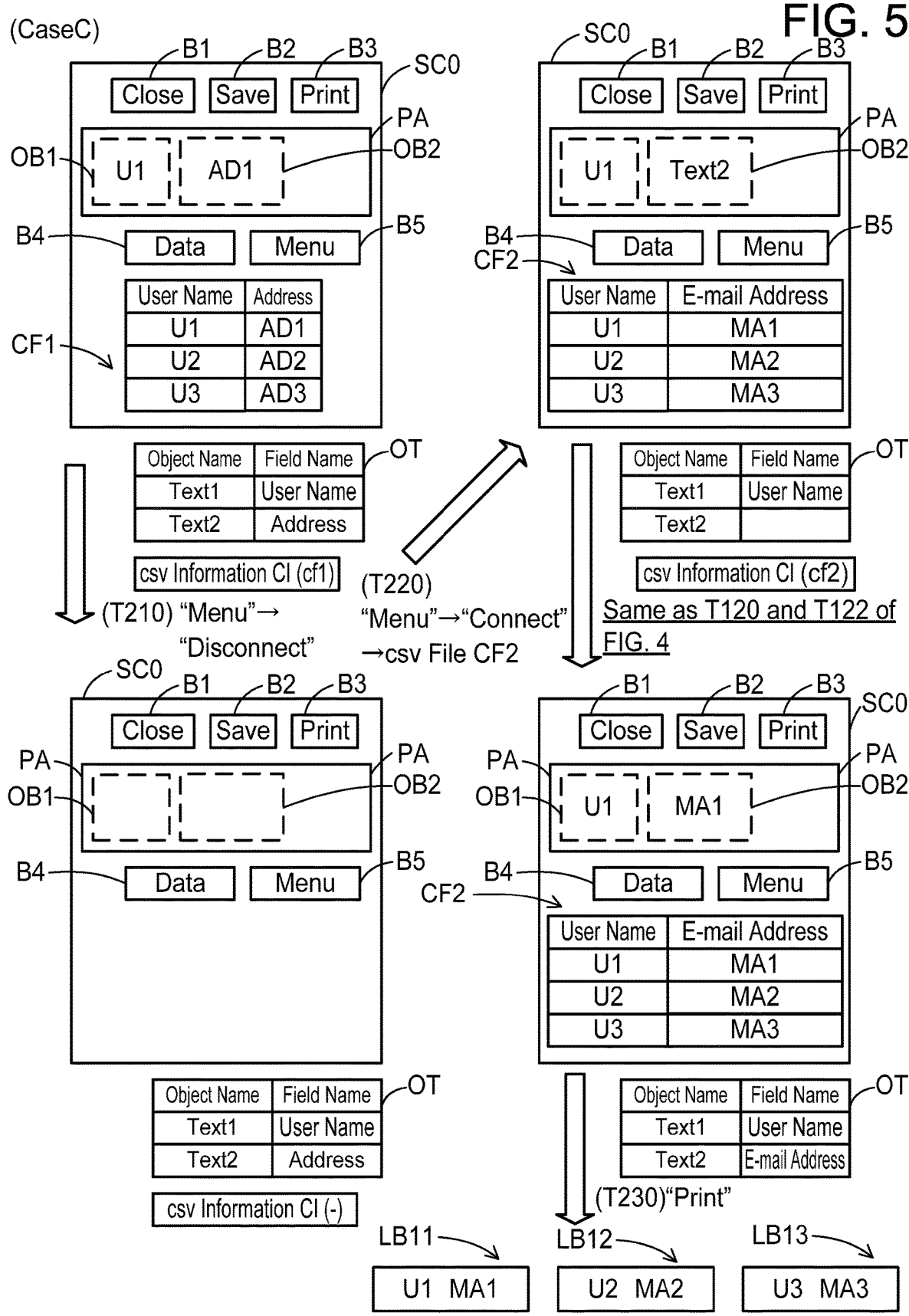
FIG. 5 illustrates a sequence of Case C in which association between the label file and the csv file is disassociated.

(Case C; FIG. 5)

With reference to FIG. 5, Case C where the first label association between the label file LF1 and the csv file CF1 is disassociated will be described. An initial state of Case C is the same as the initial state of Case B in FIG. 4.

When the selection of the Menu button B5 and selection of the "Disconnect" button MB2 (see FIG. 2) within the menu screen MS are received in T210, the mobile terminal 10 determines that a disconnection instruction which is not an instruction for associating the label file LF1 and a csv file different from the csv file CF1 has been acquired and deletes "cf1" from the csv information CI. Due to this, the first label association between the label file LF1 and the csv file CF1 is disassociated. Here, the mobile terminal 10 does not disassociate the first object association between the object area OB1 and the field name "User Name" and the second object association between the object area OB2 and the field name "Address". Further, the mobile terminal 10 sets areas within the object areas OB1, OB2 to blank state.

When the selection of the Menu button B5, the selection of the Connect button MB1 (see FIG. 2) within the menu screen MS and the selection of the csv file CF2 are received in T220, the mobile terminal 10 displays the csv file CF2 in table format on the top screen SC0. Further, the mobile terminal 10 determines that a second file connection instruction for associating the label file LF1 and the csv file CF2 has been acquired, and stores the file name "cf2" of the csv file CF2 in the csv information CI within the label file LF1. Due to this, the second label association between the label file LF1 and the csv file CF2 is stored in the memory 24. Further, the mobile terminal 10 specifies the field names "User Name" and "Address" in the object table OT. Next, the mobile terminal 10 determines that the csv file CF2 includes the field name "User Name" but does not include the field name "Address", and disassociates the second object association between the object area OB2 and the field name "Address" without disassociating the first object association between the object area OB1 and the field name "User Name". The mobile terminal 10 displays "U1" in the object area OB1 and displays "Text 2" in the object area OB2.

Next, processes the same as T120 and T122 of FIG. 4 are performed. Due to this, the object name "Text 2" and the field name "E-mail Address" are associated in the object table OT. That is, a third object association between the object area OB2 and the field name "E-mail Address" is stored in the memory 24. Also, "MA1" is displayed in the object area OB2. When selection of the Print button B3 is received in T230, the mobile terminal 10 determines that the print instruction has been acquired, and performs label printing. In the present case, similar to Case C, the labels LB11 to LB13 are printed.

(Effects of Case C)

As shown in Case C, when the disconnection instruction is acquired under the state where the first label association and the first object association are stored in the memory 24, the mobile terminal 10 disassociates the first label association without disassociating the first object association (T210). According to such configuration, the user does not need to perform the operation for associating the object area OB1 and the field name "User Name" again after the first label association has been disassociated. Thus, user convenience can be improved.

Further, when the disconnection instruction is acquired under the state where the first label association, the first object association, and the second object association are stored in the memory 24, the mobile terminal 10 disassociates the first label association without disassociating the first object association and the second object association. According to such configuration, the user does not need to perform the operation for associating the object area OB1 and the field name "User Name" and for associating the object area OB2 and the field name "Address" again after the first label association has been disassociated. Thus, user convenience can be improved.

Further, when the second file connection instruction is acquired and also the csv file CF2 includes the field name "User Name" but does not include the field name "Address" under the state where the first object association and the second object association are stored in the memory 24, the mobile terminal 10 disassociates the second object association without disassociating the first object association. In this case, the user does not need to perform the operation for associating the object area OB1 and the field name "User Name" again after the csv file associated with the label file LF1 has been changed. Thus, user convenience can be improved.

Figure 6:
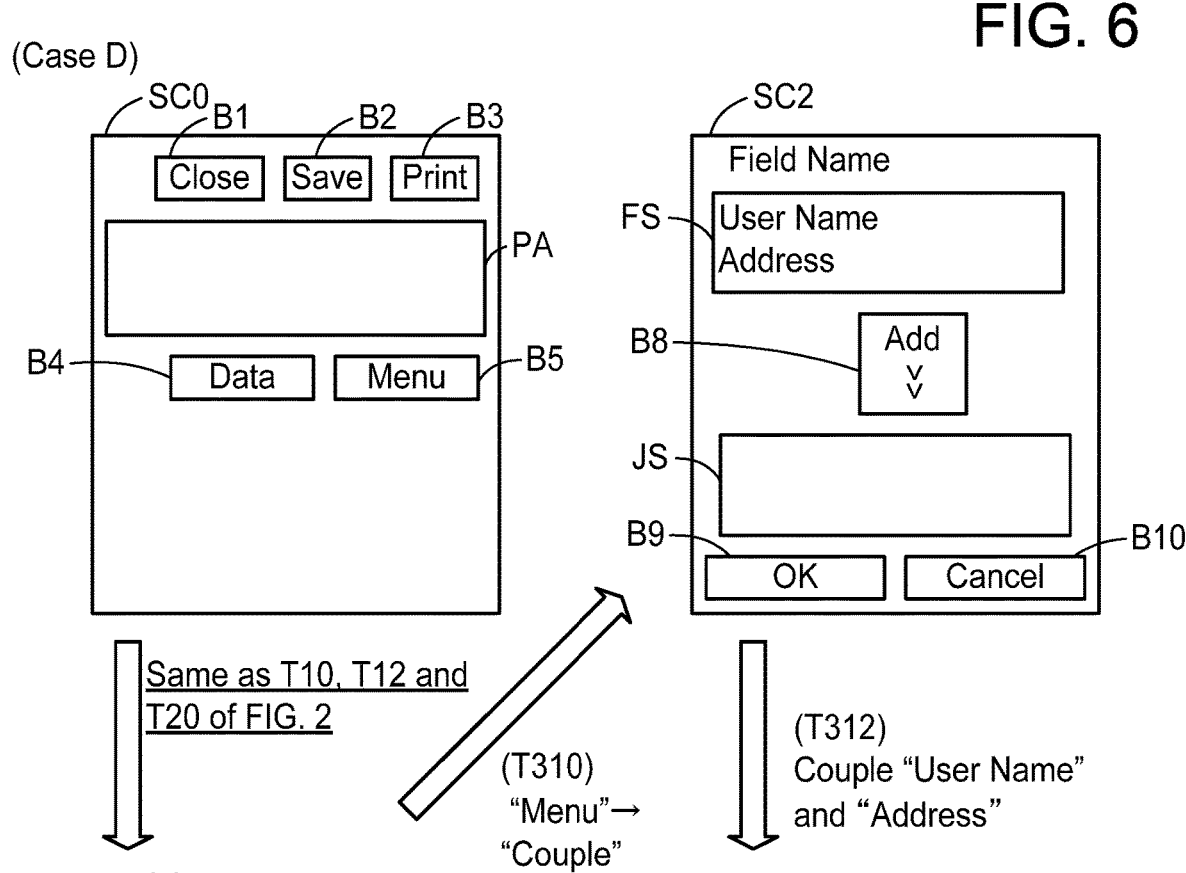
FIG. 6 illustrates a sequence of Case D in which a coupled field name is created.
Figure 6:
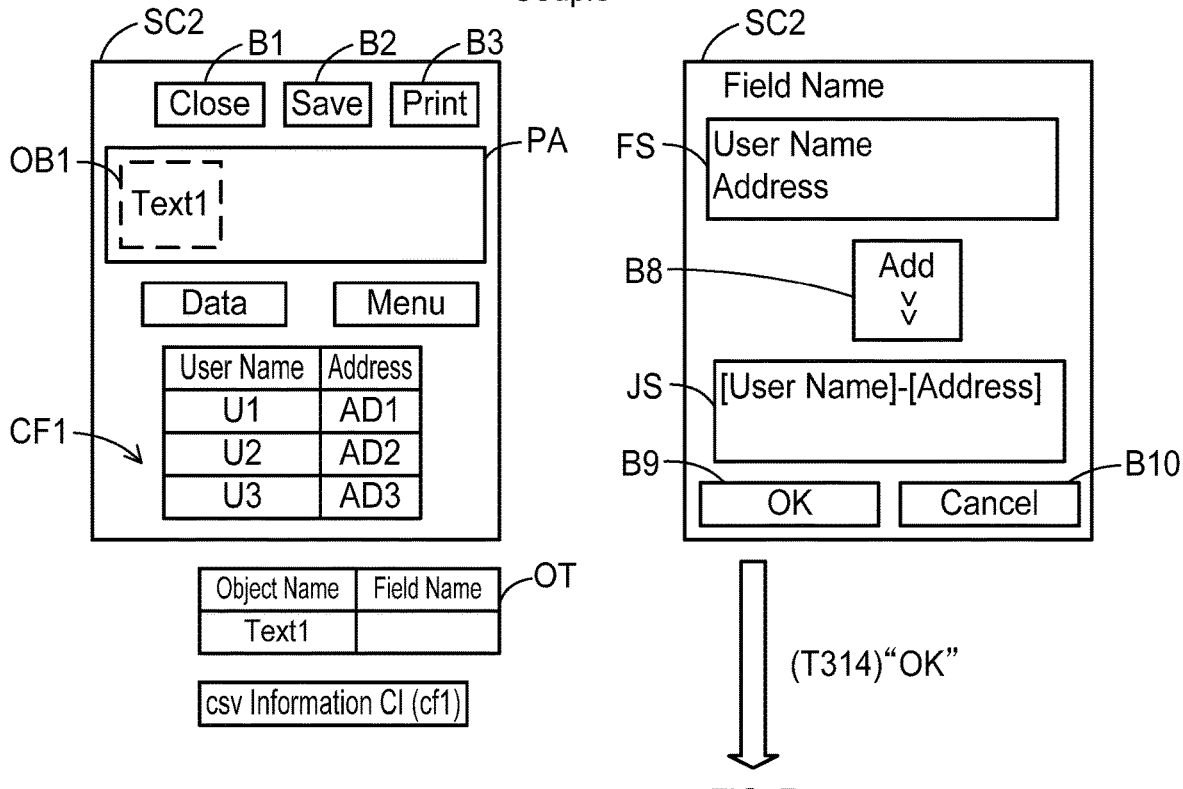
Figure 7:
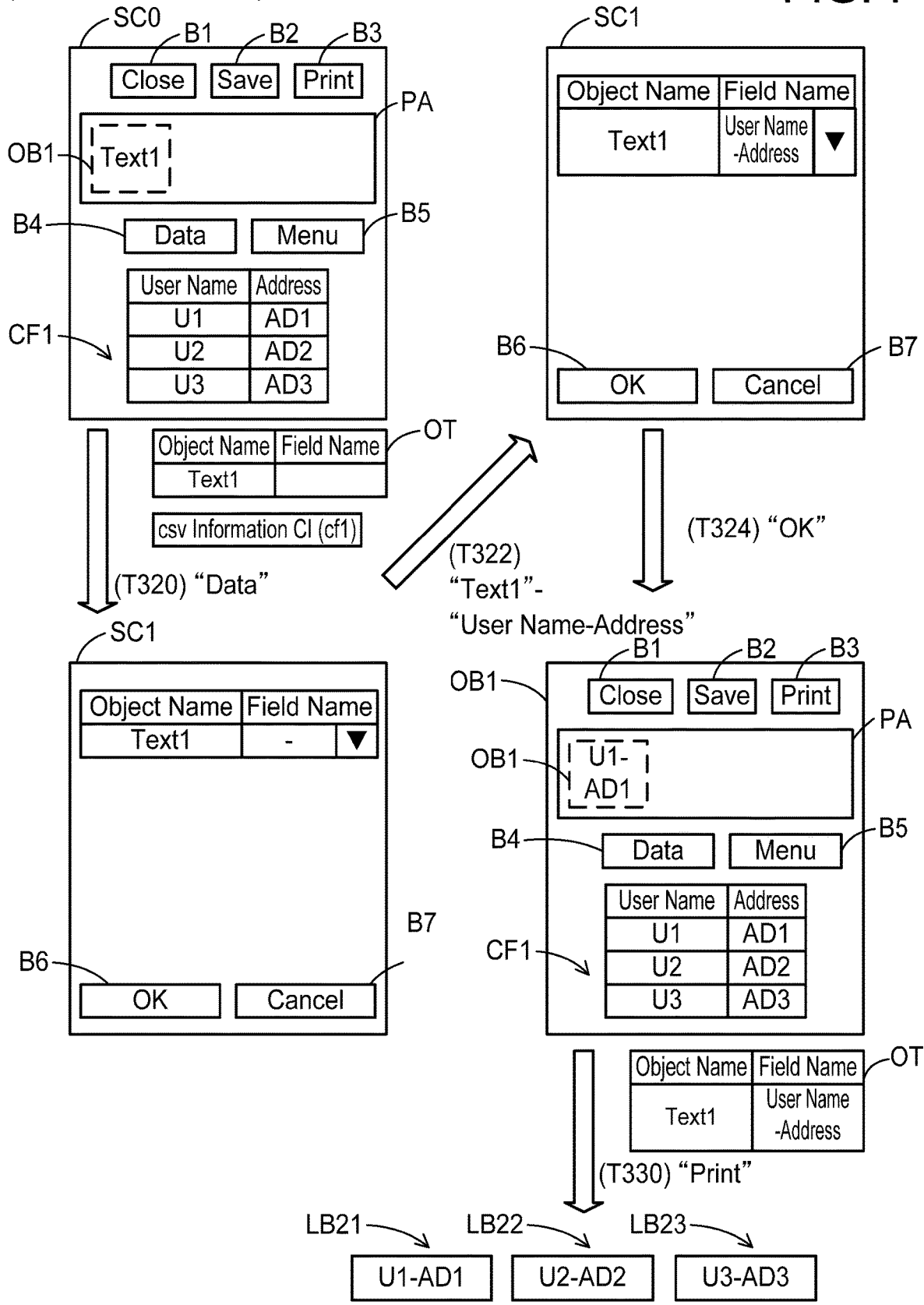
FIG. 7 illustrates a sequence which is continuation of FIG. 6.

(Case D; FIGS. 6 and 7)

With reference to FIGS. 6 and 7, Case D where a coupled field name made by two field names being coupled is created will be described. An initial state of Case D is the same as the initial state of Case A.

Firstly, processes the same as T10, T12, and T20 of FIG. 2 are performed. Due to this, the object area OB1 is displayed in the print area PA in the top screen SC0, and the text "Text 1" is displayed in the object area OB1. Further, the csv file CF1 is displayed in table format on the top screen SC0 and the file name "CF1" of the csv file CF1 is stored in the csv information CI within the label file LF1. That is, the first label association between the label file LF1 and the csv file CF1 is stored in the memory 24.

When the selection of the Menu button B5 and selection of the Couple button MB4 (see FIG. 2) in the menu screen MS are received in T310, the mobile terminal 10 displays the coupling screen SC2 on the display unit 12. The coupling screen SC2 includes a field name selection box FS, a coupled field name display box JS, an Add button B8, an OK button B9, and a Cancel button B10. When the Add button B8 is selected under a state where one field name within the field name selection box FS has been selected, the one field name is displayed in the coupled field name display box JS.

The mobile terminal 10 receives an operation for coupling the field name "User Name" and the field name "Address" in T312. Specifically, the Add button B8 is selected with the field name "User Name" in the field name selection box FS selected, and thereafter the Add button B8 is selected with the field name "Address" in the field name selection box FS selected. In this case, the mobile terminal 10 displays a coupled field name "User Name-Address" in the coupled field name display box JS. In the coupled field name, a text "-" is displayed between the coupled two field names.

When selection of the OK button B9 is received in T314, the mobile terminal 10 displays the top screen SC0 of FIG. 7 on the display unit 12. Further, the mobile terminal 10 determines that the coupling instruction for coupling the field name "User Name" and the field name "Address" has been acquired, creates the coupled field name "User Name-Address", and stores the coupled field name "User Name-Address" in association with the label file LF1. When the selection of the Data button B4 is received in T320, the mobile terminal 10 displays the object screen SC1 on the display unit 12. In the object screen SC1, a field name setting box has been associated with the object name "Text 1". The user is able to select the field names "User Name", "Address" and the coupled field name "User Name-Address" by operating the field name setting box. When an operation of selecting the coupled field name "User Name-Address" as the field name to be associated with the object name "Text 1" is received in T322, the mobile terminal 10 displays the coupled field name "User Name-Address" in the field name corresponding to the object name "Text 1". When the selection of the OK button B6 is received in T324, the mobile terminal 10 determines that a fourth object connection instruction for associating the coupled field name "User Name-Address" with the object name "Text 1" has been acquired, and stores "User Name-Address" in the field name associated with the object name "Text 1" in the object table OT. Due to this, a fourth object association between the object area OB1 and the coupled field name "User Name-Address" is stored in the memory 24. The mobile terminal 10 displays a text "U1-AD1" corresponding to the coupled field name "User Name-Address" in the object area OB1.

When selection of the Print button B3 is received in T330, the mobile terminal 10 determines that the print instruction has been acquired, and performs label printing. The mobile terminal 10 uses the label file LF1 and the csv file CF1 associated with the label file LF1 to create three pieces of print data corresponding to three pieces of text information included in the csv file CF1. In each of the three pieces of print data, a text (U1-AD1, U2-AD2, U3-AD3) corresponding to the coupled field name "User Name-Address" included in the piece of text information corresponding to this piece of print data is disposed in the object area OB1 associated with the coupled field name "User Name-Address". Next, the mobile terminal 10 sends the three pieces of print data to the label printer 50. When the three pieces of print data are received from the mobile terminal 10, the label printer 50 prints labels LB21 to LB23 by using the three pieces of print data. On the label LB21, the text "U1-AD1" is shown, on the label LB22 the text "U2-AD2" is shown, and on the label LB23 the text "U3-AD3" is shown. The labels LB21 to LB23 are different from the labels LB1 to LB3 (see FIG. 3) in that they respectively include the text "-(hyphen)".

Figure 8:
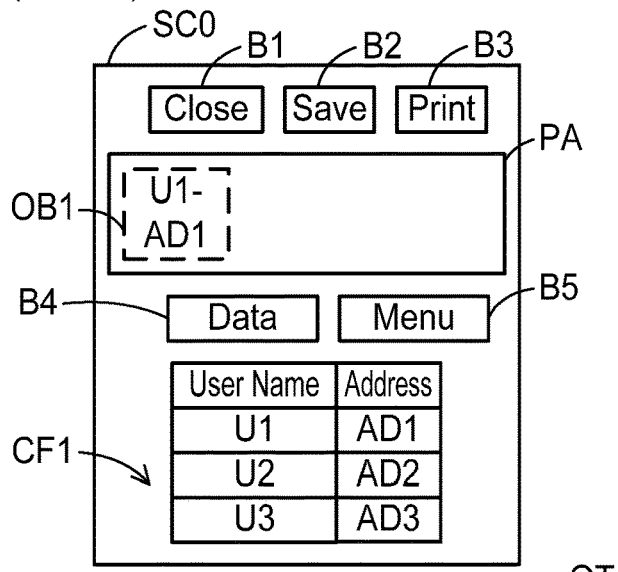
FIG. 8 illustrates a sequence of Case E in which the csv file to be associated with the label file is changed.
Figure 8:
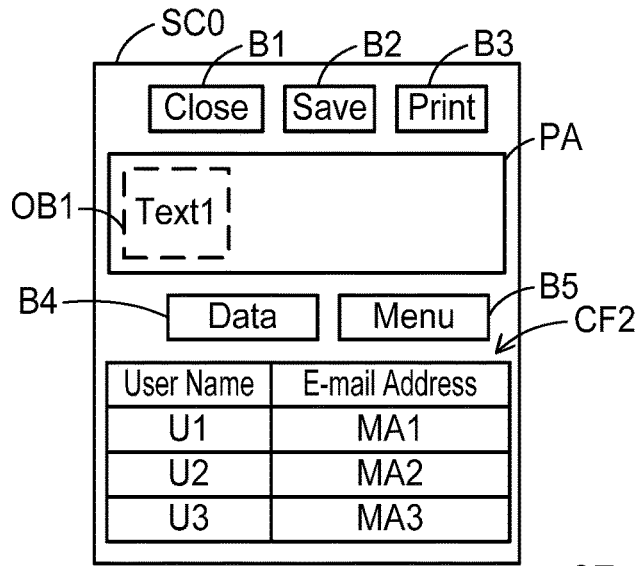

(Case E; FIG. 8)

With reference to FIG. 8, Case E where the csv file associated with the label file LF1 is changed from the csv file CF1 to the csv file CF2 will be described. An initial state of Case E is a state after Case D. That is, the memory 24 of the mobile terminal 10 has the first label association and the fourth object association stored therein.

When the selection of the Menu button B5, the selection of the Connect button MB1 (see FIG. 2) within the menu screen MS, and selection of the csv file CF2 are received in T410, the mobile terminal 10 displays the csv file CF2 in table format on the top screen SC0. Further, the mobile terminal 10 determines that a file conversion instruction has been acquired, and deletes the file name "cf1" in the csv information CI within the label file LF1 and stores the file name "cf2" of the csv file CF2 instead. Due to this, the first label association between the label file LF1 and the csv file CF1 is disassociated, and also the second label association between the label file LF1 and the csv file CF2 is stored in the memory 24. Further, the mobile terminal 10 specifies the coupled field name "User Name-Address" in the object table OT and specifies the two field names "User Name" and "Address" included in this coupled field name. Next, the mobile terminal 10 determines that the csv file CF2 does not include at least one of the specified field names "User Name" and "Address", that is, the field name "Address", and disassociates the fourth object association between the object area OB1 and the coupled field name "User Name-Address". Specifically, the mobile terminal 10 deletes the coupled field name "User Name-Address" associated with the object name "Text 1" in the object table OT. The mobile terminal 10 also changes the text in the object area OB1 from "U1-AD1" to "Text 1".

Figure 9:
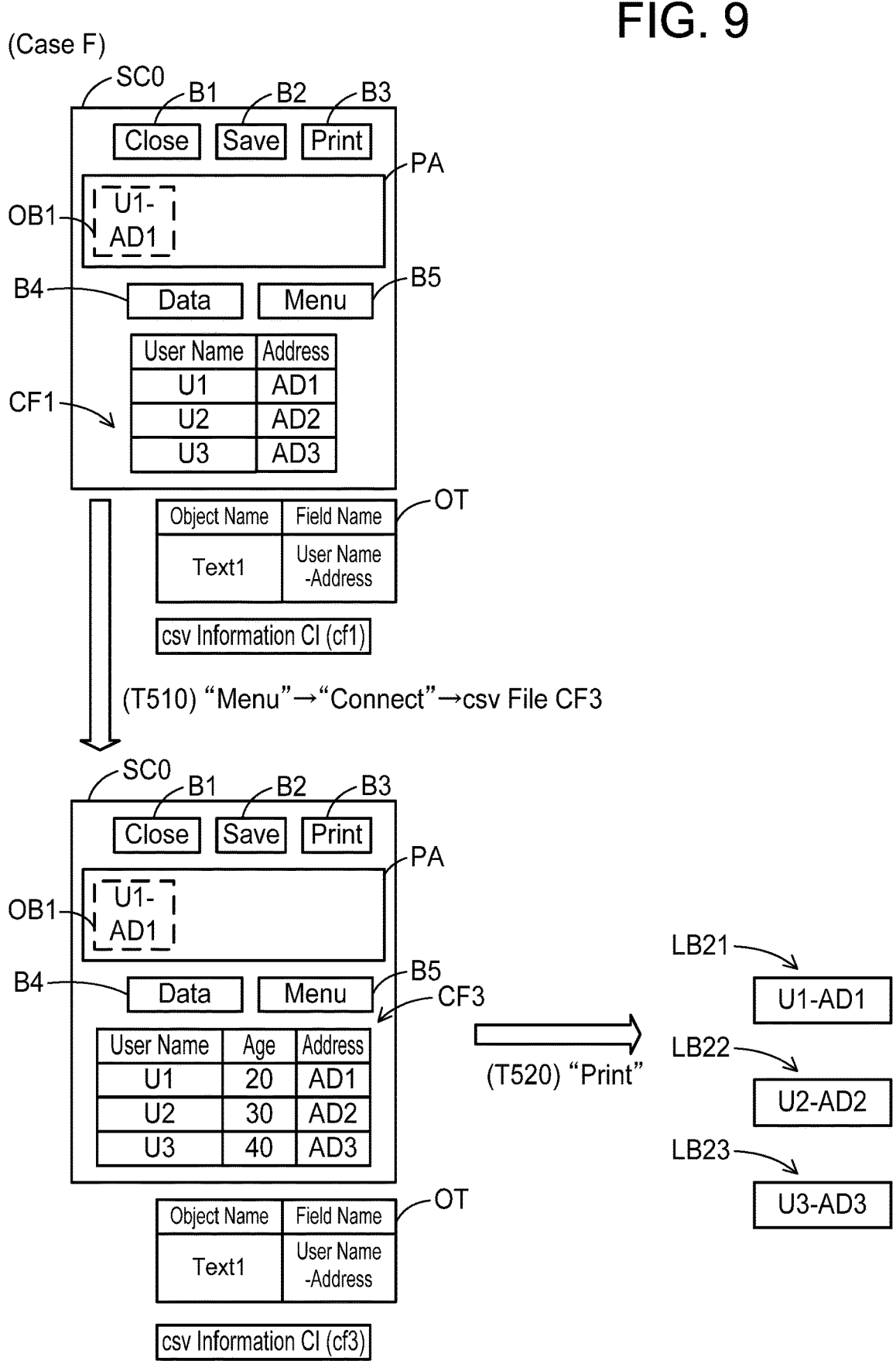
FIG. 9 illustrates a sequence of Case F in which the csv file to be associated with the label file is changed.

(Case F; FIG. 9)

With reference to FIG. 9, Case F where the csv file associated with the label file LF1 is changed from the csv file CF1 to the csv file CF3 will be described. An initial state of Case F is the same as the initial state of Case E in FIG. 8.

When the selection of the Menu button B5, the selection of the Connect button MB1 (see FIG. 2) in the menu screen MS, and selection of the csv file CF3 are received in T510, the mobile terminal 10 displays the csv file CF3 in table format on the top screen SC0. Further, the mobile terminal 10 determines that the file conversion instruction for associating the label file LF1 and the csv file CF3 different from the csv file CF1 has been acquired, and deletes the file name "cf1" in the csv information CI within the label file LF1 and stores the file name "cf3" of the csv file CF3 instead. In a modification, the mobile terminal 10 may overwrite the file name "cf1" with the file name "cf3" in the csv information CI within the label file LF1. Due to this, the first label association between the label file LF1 and the csv file CF1 is disassociated, and a third label association between the label file LF1 and the csv file CF3 is stored in the memory 24. The mobile terminal 10 also specifies the coupled field name "User Name-Address" in the object table OT, and specifies the two field names "User Name" and "Address" included in this coupled field name. Next, the mobile terminal 10 determines that the csv file CF3 includes the specified field names "User Name" and "Address" and does not disassociate the fourth object association between the object area OB1 and the coupled field name "User Name-Address". When the selection of the Print button B3 is received in T520, the mobile terminal 10 determines that the print instruction has been acquired, and performs label printing. In the present case, similar to Case D, the labels LB21 to LB23 are printed. Further, when the selection of the Menu button B5 and selection of the Disconnect button MB2 (see FIG. 2) within the menu screen MS are received under the state of FIG. 9, the mobile terminal 10 deletes "cf1" from the csv information CI, but does not disassociate the fourth object association between the object area OB1 and the coupled field name "User Name-Address".

(Effects of Cases E, F)

As shown in Case F, when the file conversion instruction is acquired under the state where the first label association and the fourth object association are stored in the memory 24, the mobile terminal 10 disassociates the first label association without disassociating the fourth object association (T510). According to such configuration, the user does not need to perform operation for associating the object area OB1 and the coupled field name "User Name-Address" again after the first label association has been disassociated. Thus, user convenience can be improved.

As shown in Case F, when the file conversion instruction is acquired and the csv file CF3 includes the field names "User Name" and "Address" under the state where the first label association and the fourth object association are stored in the memory 24, the mobile terminal 10 disassociates the first label association without disassociating the fourth object association (T510). On the other hand, as shown in Case E in FIG. 8, when the file conversion instruction is acquired and the csv file CF2 does not include the field name "Address" under the state where the first label association and the fourth object association are stored in the memory 24, the mobile terminal 10 disassociates the first label association and disassociates the fourth object association (T410). According to such configuration, the mobile terminal 10 can suitably switch whether it disassociates the fourth object association between the object area OB1 and the coupled field name "User Name-Address", depending on whether the csv file to be newly associated with the label file LF1 includes the field names "User Name" and "Address" included in the coupled field name "User Name-Address" or not.

(Effects of Present Embodiment)

According to the above features, when the file conversion instruction or the disconnection instruction is acquired under the state where the first label association and the first object association are stored in the memory 24, the mobile terminal 10 disassociates the first label association between the label file LF1 and the csv file CF1 without disassociating the first object association between the object area OB1 and the field name "User Name". Due to this, even when the first label association between the label file LF1 and the csv file CF1 is disassociated, the first object association between the object area OB1 and the field name "User Name" is maintained. Thus, user convenience can be improved.

(Correspondence Relationship)

The csv file CF1 is an example of "first database file". The first file connection instruction is an example of "first association instruction". The first label association is an example of "first association". The field name "User Name" in the csv file CF1 is an example of "first field name". The texts "U1", "U2", "U3" in the csv file CF1 are each an example of "first text". The object area OB1 is an example of "first object area". The first object connection instruction is an example of "second association instruction". The first object association is an example of "second association". The disconnection instruction and the file conversion instruction are examples of "disassociation instruction."

The disconnection instruction is an example of "first type disassociation instruction". The field name "Address" in the csv file CF1 is an example of "second field name". The texts "AD1", "AD2", "AD3" in the csv file CF1 are each an example of "second text". The object area OB2 is an example of "second object area". The second object connection instruction is an example of "third association instruction". The second object association is an example of "third association". The csv files CF2, CF3 are examples of "second database file". The file conversion instruction is an example of "fourth association instruction". The second label association is an example of "fourth association" and "fifth association". The first file conversion instruction is an example of "second type disassociation instruction". The fourth object connection instruction is an example of "fifth association instruction". The fourth object association is an example of "sixth association".

The process performed by the mobile terminal 10 after T20 of FIG. 2 is an example of process performed by "store a first association". The process performed by the mobile terminal 10 after T24, T26 of FIG. 3 is an example of process performed by "store a second association". The process performed by the mobile terminal 10 after T30 of FIG. 3 is an example of process performed by "create N pieces of first print data", "send the N pieces of first print data". The process performed by the mobile terminal 10 after T110 of FIGS. 4 and T210 of FIG. 5 is an example of process performed by "disassociate the first association".

SECOND EMBODIMENT

In the present embodiment, the content of process performed by the mobile terminal 10 when the csv file CF2 is selected as the csv file to be associated with the label file LF1 is different from that of the first embodiment.

Figure 10:
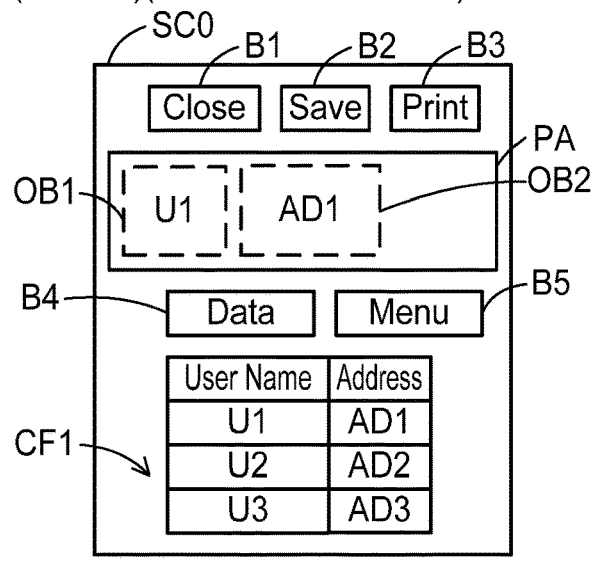
FIG. 10 illustrates a sequence of Case G in which a csv file to be associated with a label file is changed in a second embodiment.
Figure 10:
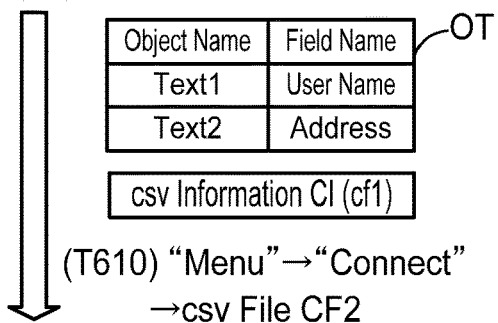
Figure 10:
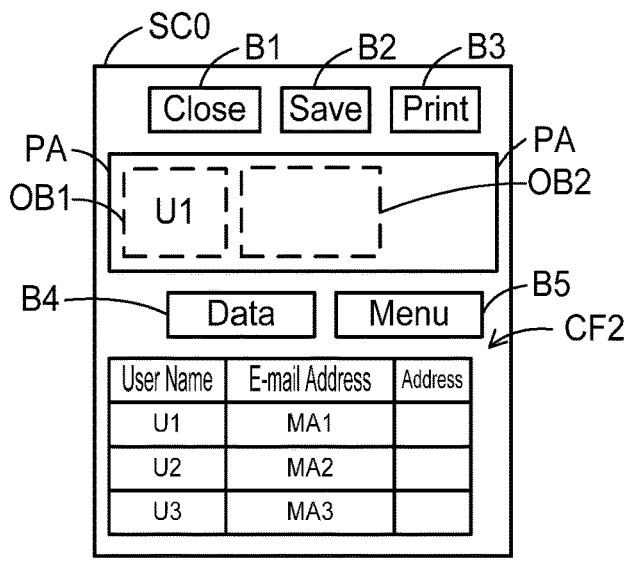
Figure 10:
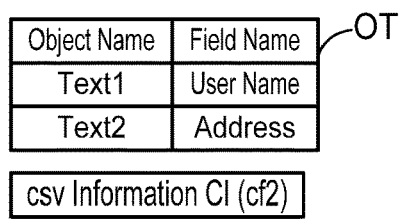

(Case G; FIG. 10)

With reference to FIG. 10, Case G where the csv file associated with the label file LF1 is changed from the csv file CF1 to the csv file CF2 will be described. An initial state of Case G is the same as the initial state of Case B of FIG. 4.

When the selection of the Menu button B5, the selection of the Connect button MB1 (see FIG. 2) in the menu screen MS, and the selection of the csv file CF2 are received in T610, the mobile terminal 10 displays the csv file CF2 in table format on the top screen SC0. Further, the mobile terminal 10 determines that the file conversion instruction has been acquired, and deletes the file name "cf1" in the csv information CI in the label file LF1 and stores the file name "cf2" instead. Due to this, the first label association between the label file LF1 and the csv file CF1 is disassociated and the second label association between the label file LF1 and the csv file CF2 is stored in the memory 24. Further, the mobile terminal 10 determines that the csv file CF2 includes the field name "User Name" but does not include the field name "Address". In this case, the mobile terminal 10 adds the field name "Address" to the csv file CF2 and changes the text in the object area OB2 from "AD1" to blank state. In the present case, the first object association between the object area OB1 and the field name "User Name" and the second object association between the object area OB2 and the field name "Address" are not disassociated. Thereafter, the user can input the text "AD1", for example, in a box corresponding to the field name "Address" of the csv file CF2, and thus can print the labels LB11 to LB13 (see FIG. 4) each including the text corresponding to the field name "User Name" and the text corresponding to the field name "Address".

(Effects of Case G)

As shown in Case G, when the file conversion instruction is acquired and the csv file CF2 includes the field name "User Name" but does not include the field name "Address" under the state where the first label association, the first object association, and the second object association are stored in the memory 24, the mobile terminal 10 disassociates the first label association without disassociating the first object association and the second object association (T610). Further, the mobile terminal 10 adds the field name "Address" to the csv file CF2 (T610). According to such configuration, the user does not need to perform operation for associating the object area OB2 and the field name "Address" again after the csv file associated with the label file LF1 has been changed. Thus, user convenience can be improved.

Figure 11:
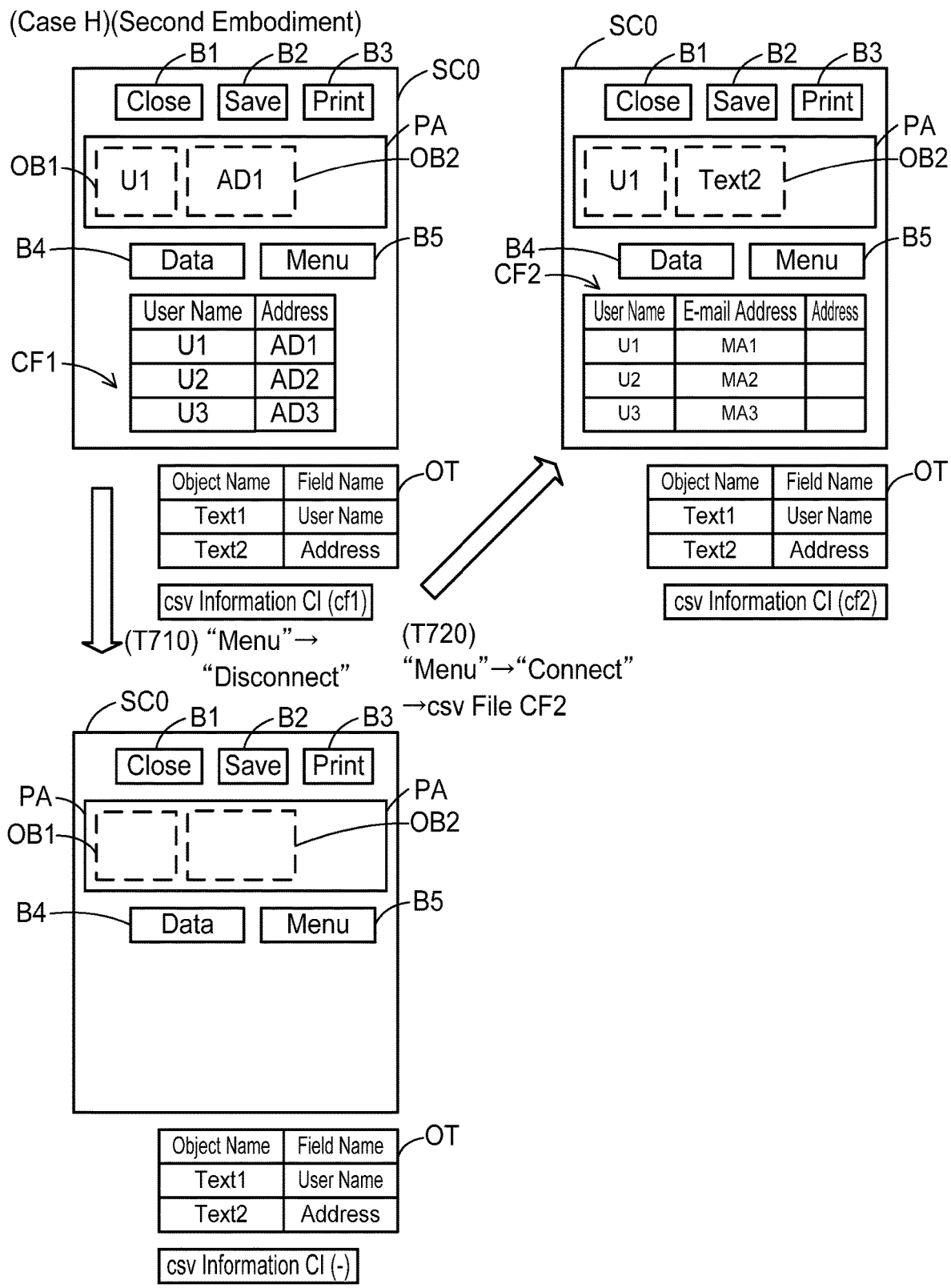
FIG. 11 illustrates a sequence of Case H in which association between the label file and the csv file is disassociated in the second embodiment.

(Case H; FIG. 11)

With reference to FIG. 11, Case H where the first label association between the label file LF1 and the csv file CF1 is disassociated will be described. An initial state of Case H is the same as the initial state of Case B of FIG. 4.

When the selection of the Menu button B5 and the selection of the Disconnect button MB2 (see FIG. 2) in the menu screen MS are received in T710, the mobile terminal 10 determines that the disconnection instruction has been acquired and deletes "cf1" from the csv information CI. Due to this, the first label association between the label file LF1 and the csv file CF1 is disassociated. Here, the mobile terminal 10 does not disassociate the first object association and the second object association. Further, the mobile terminal 10 sets areas within the object areas OB1, OB2 in blank states.

When the selection of the Menu button B5, the selection of the Connect button MB1 (see FIG. 2) in the menu screen MS, and the selection of the csv file CF2 are received in T720, the mobile terminal 10 determines that the second file connection instruction has been acquired, and performs processes the same as the processes after T610 of Case G in FIG. 10. That is, the mobile terminal 10 adds the field name "Address" to the csv file CF2 without disassociating the first object association and the second object association.

(Effects of Case H)

As shown in Case H, when the second file connection instruction is acquired and the csv file CF2 includes the field name "User Name" but does not include the field name "Address" under the state where the first object association and the second object association are stored in the memory 24, the mobile terminal 10 disassociates the first label association without disassociating the first object association and the second object association (T720). Further, the mobile terminal 10 adds the field name "Address" to the csv file CF2 (T710). According to such configuration, the user does not need to perform the operation for associating the object area OB2 and the field name "Address" again after the csv file associated with the label file LF1 has been changed. Thus, user convenience can be improved.

(First Modification) "Database file" may not be limited to a csv file, but simply needs to be a file which is capable of showing plural texts in table format. For example, it may be an Excel file. Also, instead of the Connect button MB1 displayed on the menu screen MS of FIG. 2, an Open button may be displayed on the menu screen MS.

(Second Modification) When the disconnection instruction is acquired under the state where the first object association is stored in the memory 24, the mobile terminal 10 may disassociate the first object association, and when the file conversion instruction is acquired in the same state, the mobile terminal 10 may not disassociate the first object association. In the present modification, "disassociate the third association", "add the second field name" may be omitted.

(Third Modification) In Case C of FIG. 5, when the disconnection instruction is acquired (T210), the mobile terminal 10 may disassociate one of the first object association and the second object association.

(Fourth Modification) In Case G of FIG. 10 and Case H of FIG. 11, when the file conversion instruction and the second file connection instruction are acquired (T610, T720), the mobile terminal 10 may disassociate the second object association without disassociating the first object association, and add the field name "Address" to the csv file CF2.

(Fifth Modification) When the file conversion instruction is acquired under the state where the first object association is stored in the memory 24, the mobile terminal 10 may disassociate the first object association, and when the disconnection instruction is acquired in the same state, the mobile terminal 10 may not disassociate the first object association.

(Sixth Modification) In Case B of FIG. 4, when the second file connection instruction is acquired (T110), the mobile terminal 10 may not disassociate the first object association and the second object association.

(Seventh Modification) The mobile terminal 10 may not be capable of creating a coupled field name. In the present modification, "create a coupled field name", "store a sixth association", "create N pieces of second print data", "send the N pieces of second print data", "disassociate the first association between the label file and the first database file without disassociating the sixth association between the first object area and the coupled field name" may be omitted.

(Eighth Modification) In Case F of FIG. 9, when the file conversion instruction is acquired under the state where the first label association and the fourth association are stored in the memory 24, the mobile terminal 10 may disassociate the first label association and the fourth object association even if a new label file includes the two field names "User Name" and "Address".

(Ninth Modification) The object area OB1 may not have the object name "Text 1". For example, the mobile terminal 10 may store a field name (for example "User Name") to be associated with the object area OB1 in association with an area in which information related to the object area OB1 is written in the label file LF1.

(Tenth Modification) As shown in FIG. 1, the object table OT may be stored in an application storing area within the memory 24 of the mobile terminal 10. The application storing area is a work area which is used temporarily under a state where the print application 30 is active. Further, in another modification, in the memory 24 of the mobile terminal 10, information corresponding to the object table OT may be stored in a file different from the label file LF1.

(Eleventh Modification) In each of the above embodiments, although respective processes of FIGS. 2 to 11 are realized by software (i.e., print application 30), at least one of these processes may be realized by hardware such as a logic circuit.

What is claimed is:

1. A non-transitory computer-readable recording medium storing computer-readable instructions for a terminal device, wherein the terminal device comprises:
    a processor, and
    a memory:
    wherein the computer-readable instructions, when executed by the processor, cause the terminal device to:
    in a case where a first association instruction for associating a label file and a first database file is acquired, store a first association between the label file and the first database file in the memory, wherein one or more object areas where a print target text is to be disposed are defined are in the label file, the first database file includes one or more field names and M pieces (M being an integer of 1 or more) of text information, and each of the M pieces of text information includes a first text associated with a first field name among the one or more field names;
    in a case where a second association instruction for associating a first object area among the one or more object areas and the first field name is acquired, store a second association between the first object area and the first field name in the memory;
    in a case where a first print instruction for instructing printing using the label file is acquired under a state where the first association and the second association are stored in the memory, create N pieces (N being an integer of 1 or more and equal to or less than the M) of first print data using the label file and the first database file associated with the label file, the N pieces of first print data corresponding to N pieces of text information among the M pieces of text information included in the first database file, wherein in each of the N pieces of first print data, the first text included in the text information corresponding to the first print data is disposed in the first object area associated with the first field name;
    send the N pieces of first print data to a label printer; and
    in a case where a disassociation instruction for disassociating the first association between the label file and the first database file is acquired under the state where the first association and the second association are stored in the memory, disassociate the first association between the label file and the first database file without disassociating the second association between the first object area and the first field name.

2. The non-transitory computer-readable recording medium as in claim 1, wherein
    the disassociation instruction includes a first-type disassociation instruction which is not an instruction for associating the label file and a database file different from the first database file, and
    in a case where the first-type disassociation instruction is acquired under the state where the first association and the second association are stored in the memory, the first association between the label file and the first database file is disassociated without disassociating the second association between the first object area and the first field name.

3. The non-transitory computer-readable recording medium as in claim 2, wherein
    each of the M pieces of text information further includes a second text associated with a second field name among the one or more field names, the second field name being different from the first field name,
    wherein the computer-readable instructions, when executed by the processor, further cause the terminal device to:
    in a case where a third association instruction for associating a second object area among the one or more object areas and the second field name is acquired, store a third association between the second object area and the second field name in the memory, the second object area being different from the first object area,
    wherein in a case where the first print instruction is acquired under a state where the first association, the second association, and the third association are stored in the memory, the N pieces of first print data corresponding to the N pieces of text information are created,
    in each of the N pieces of first print data, the first text included in the text information corresponding to the first print data is disposed in the first object area associated with the first field name and the second text included in the text information is disposed in the second object area associated with the second field name, and
    in a case where the first-type disassociation instruction is acquired under the state where the first association, the second association, and the third association are stored in the memory, the first association between the label file and the first database file is disassociated without disassociating the second association between the first object area and the first field name and the third association between the second object area and the second field name.

4. The non-transitory computer-readable recording medium as in claim 3, wherein the computer-readable instructions, when executed by the processor, further cause the terminal device to:
in a case where a fourth association instruction for associating the label file and a second database file different from the first database file is acquired after the first-type disassociation instruction has been acquired, store a fourth association between the label file and the second database file in the memory; and
in a case where the fourth association instruction is acquired and the second database file includes the first field name and does not include the second field name under a state where the second association and the third association are stored in the memory, disassociate the third association between the second object area and the second field name without disassociating the second association between the first object area and the first field name.

5. The non-transitory computer-readable recording medium as in claim 3, wherein
the computer-readable instructions, when executed by the processor, further cause the terminal device to:
in a case where a fourth association instruction for associating the label file and a second database file different from the first database file is acquired after the first-type disassociation instruction has been acquired, store a fourth association between the label file and the second database file in the memory; and
in a case where the fourth association instruction is acquired and the second database file includes the first field name but does not include the second field name under a state where the second association and the third association are stored in the memory, add the second field name to the second database file without disassociating the second association between the first object area and the first field name and the third association between the second object area and the second field name.

6. The non-transitory computer-readable recording medium as in claim 1, wherein
the disassociation instruction includes a second-type disassociation instruction for associating the label file and a second database file different from the first database file, and
in a case where the second-type disassociation instruction is acquired under the state where the first association and the second association are stored in the memory, the first association between the label file and the first database file is disassociated without disassociating the second association between the first object area and the first field name,
wherein the computer-readable instructions, when executed by the processor, further cause the terminal device to:
in the case where the second-type disassociation instruction is acquired under the state where the first association and the second association are stored in the memory, store a fifth association between the label file and the second database file in the memory after the first association between the label file and the first database file has been disassociated.

7. The non-transitory computer-readable recording medium as in claim 6, wherein
each of the M pieces of text information further includes a second text associated with a second field name among the one or more field names, the second field name being different from the first field name,
wherein the computer-readable instructions, when executed by the processor, further cause the terminal device to:
in a case where a third association instruction for associating a second object area among the one or more object areas and the second field name is acquired, store a third association between the second object area and the second field name in the memory, the second object area being different from the first object area,
wherein in a case where the first print instruction is acquired under a state where the first association, the second association, and the third association are stored in the memory, the N pieces of first print data corresponding to the N pieces of text information are created,
in each of the N pieces of first pint data, a first text included in the text information corresponding to the first print data is disposed in the first object area associated with the first field name and a second text included in the text information is disposed in the second object area associated with the second field name, and
in a case where the second-type disassociation instruction is acquired and the second database file includes the first field name but does not include the second field name under the state where the first association, the second association, and the third association are stored in the memory, the first association between the label file and the first database file and the third association between the second object area and the second field name are disassociated without disassociating the second association between the first object area and the first field name.

8. The non-transitory computer-readable recording medium as in claim 6, wherein
each of the M pieces of text information further includes a second text associated with a second field name among the one or more field names, the second field name being different from the first field name,
wherein the computer-readable instructions, when executed by the processor, further cause the terminal device to:
in a case where a third association instruction for associating a second object area among the one or more object areas and the second field name is acquired, store a third association between the second object area and the second field name in the memory, the second object area being different from the first object area,
wherein in a case where the first print instruction is acquired under a state where the first association, the second association, and the third association are stored in the memory, the N pieces of first print data corresponding to the N pieces of text information are created,
in each of the N pieces of first print data, a first text included in the text information corresponding to the first print data is disposed in the first object area associated with the first field name and a second text included in the text information is disposed in the second object area associated with the second field name, and
in a case where the second-type disassociation instruction is acquired and the second database file includes the first field name but does not include the second field name under the state where the first association, the second association, and the third association are stored in the memory, the first association between the label file and the first database file is disassociated without disassociating the second association between the first object area and the first field name and the third association between the second object area and the second field name, wherein the computer-readable instructions, when executed by the processor, further cause the terminal device to:

in a case where the second-type disassociation instruction is acquired and the second database file includes the first field name but does not include the second field name under the state where the first association, the second association, and the third association are stored in the memory, add the second field name to the second database file.

9. The non-transitory computer-readable recording medium as in claim 1, wherein each of the M pieces of text information further includes a second text associated with a second field name among the one or more field names, the second field name being different from the first field name, wherein the computer-readable instructions, when executed by the processor, further cause the terminal device to:

in a case where a coupling instruction for coupling the first field name and the second field name is acquired, create a coupled field name;

in a case where a fifth association instruction for associating the first object area and the coupled field name is acquired, store a sixth association between the first object area and the coupled field name in the memory;

in a case where a second print instruction for instructing printing using the label file is acquired under a state where the first association and the sixth association are stored in the memory, create N pieces of second print data using the label file and the first database file associated with the label file, the N pieces of second print data corresponding to the N pieces of text information included in the first database file, wherein in each of the N pieces of second print data, a first text and a second text included in text information corresponding to the second print data are disposed in the first object area associated with the coupled field name;

send the N pieces of second print data to the label printer; and in a case where the disassociation instruction is acquired under the state where the first association and the sixth association are stored in the memory, disassociate the first association between the label file and the first database file without disassociating the sixth association between the first object area and the coupled field name.

10. The non-transitory computer-readable recording medium as in claim 9, wherein the disassociation instruction includes a second-type disassociation instruction for associating the label file and a second database file different from the first database file, in a case where the second-type disassociation instruction is acquired and the second database file includes the first field name and the second field name under the state where the first association and the sixth association are stored in the memory, the first association between the label file and the first database file is disassociated without disassociating the sixth association between the first object area and the coupled field name, and in a case where the second-type disassociation instruction is acquired and the second database file does not include at least one of the first field name and the second field name under the state where the first association and the sixth association are stored in the memory, the first association between the label file and the first database file and the sixth association between the first object area and the coupled field name are disassociated.

11. The non-transitory computer-readable recording medium as in claim 1, wherein in a case where the second association instruction is acquired, the second association is stored in the memory by storing an object name for identifying the first object area and the first field name in the memory.

12. The non-transitory computer-readable recording medium as in claim 1, wherein in a case where the second association instruction is acquired, the second association is written in the label file stored in the memory.

13. The non-transitory computer-readable recording medium as in claim 1, wherein in a case where the second association instruction is acquired, the second association is stored in a work area in the memory allocated to the computer-readable instructions.

14. A method executed by a terminal device, the method comprising:

in a case where a first association instruction for associating a label file and a first database file is acquired, storing a first association between the label file and the first database file in a memory of the terminal device, wherein one or more object areas where a print target text is to be disposed are defined in the label file, the first database file includes one or more field names and M pieces (M being an integer of 1 or more) of text information, and each of the M pieces of text information includes a first text associated with a first field name among the one or more field names;

in a case where a second association instruction for associating a first object area among the one or more object areas and the first field name is acquired, storing a second association between the first object area and the first field name in the memory;

in a case where a first print instruction for instructing printing using the label file is acquired under a state where the first association and the second association are stored in the memory, creating N pieces (N being an integer of 1 or more and equal to or less than the M) of first print data using the label file and the first database file associated with the label file, the N pieces of first print data corresponding to N pieces of text information among the M pieces of text information included in the first database file, wherein in each of the N pieces of first print data, a first text included in the text information corresponding to the first print data is disposed in the first object area associated with the first field name;

sending the N pieces of first print data to a label printer; and in a case where a disassociation instruction for disassociating the first association between the label file and the first database file is acquired under the state where the first association and the second association are stored in the memory, disassociating the first association between the label file and the first database file without disassociating the second association between the first object area and the first field name.

\* \* \* \* \*